US007454629B2

(12) United States Patent
Timmermans et al.

(10) Patent No.: US 7,454,629 B2
(45) Date of Patent: Nov. 18, 2008

(54) ELECTRONIC DATA PROCESSING DEVICE

(75) Inventors: Peter Timmermans, Brussels (BE); Carl Van Himbeeck, Brussels (BE); Marc Moons, Brussels (BE)

(73) Assignee: Atos Worldline SA, Brussels (BE)

( * ) Notice: Subject to any disclaimer, the term of this patent is extended or adjusted under 35 U.S.C. 154(b) by 573 days.

(21) Appl. No.: 11/003,474

(22) Filed: Dec. 6, 2004

(65) Prior Publication Data

US 2005/0182961 A1   Aug. 18, 2005

(30) Foreign Application Priority Data

Dec. 12, 2003   (EP)   ................... 03028491

(51) Int. Cl.
*G06F 11/30* (2006.01)
(52) U.S. Cl. ................ 713/194; 713/187; 713/189; 726/26
(58) Field of Classification Search ............ 713/194, 713/189, 187; 726/26; 341/50; 340/539.3; 705/57–58; 257/922
See application file for complete search history.

(56) References Cited

U.S. PATENT DOCUMENTS

| 4,882,752 A | 11/1989 | Lindman et al. |
| 5,457,748 A | 10/1995 | Bergum et al. |
| 6,292,898 B1 | 9/2001 | Sutherland |
| 6,917,299 B2 * | 7/2005 | Fu et al. .................. 340/686.1 |

FOREIGN PATENT DOCUMENTS

EP   1 160 647   12/2001

* cited by examiner

*Primary Examiner*—Kimyen Vu
*Assistant Examiner*—Baotran N To
(74) *Attorney, Agent, or Firm*—Akerman Senterfitt

(57) ABSTRACT

An electronic data processing device, comprising an access protected memory, provided for storing secure data and a data processing member, provided for processing said secure data, said terminal comprises a tampering detection and protection circuit provided for detecting a tamper condition and for generating a tamper signal upon detection of said tamper condition, said tampering detection and protection circuit being connected to a tampering sequencer, provided for disabling said processing member upon receipt of said tampering signal, said memory comprises a security register provided for storing keys for encrypting said secure data and a memory section provided for storing keys for encrypting said secure data and a memory section provided for temporarily storing secure data processed by said data processing member, said tampering sequencer comprises an internal clock generator provided for generating, upon receipt of said tamper signal a tamper pulse and a series of clock pulses, said tampering sequencer being provided for erasing under control of said tamper pulse, said security data stored in said security register and for erasing, under control of said series of clock pulses said processed secure data stored in said memory section.

11 Claims, 1 Drawing Sheet

ELECTRONIC DATA PROCESSING DEVICE

CROSS-REFERENCE TO RELATED APPLICATIONS

This application claims priority from, European Application No. 03028491.3 filed 12 Dec. 2003, the disclosure of which is hereby incorporated by reference.

BACKGROUND

The invention relates to an electronic data processing device, comprising an access protected memory, provided for storing secure data, in particular data related to a fund transfer, and a data processing member connected to said memory via a bus and provided for processing said secure data, said terminal comprises a tampering detection and protection circuit connected to said bus and provided for detecting a tampering condition and for generating a tampering signal, upon detection of said tampering condition, said tampering detection and protection circuit being connected to a tampering sequencer provided for disabling said processing member, upon receipt of said tampering signal.

Such an electronic data processing device is known and is for example used in an ATM (Automatic Teller Machine) or POS (Point of Sales). The access to the memory and the processing member of such a terminal needs to be carefully protected against tamper actions in order to avoid unauthorised access to the memory or the data processing member. Tamper actions can be of all kinds such as breaking open the device in order to get access to the bus or the memory. In order to detect such a tamper action, the known devices have a tampering detection and protection circuit which, upon detection of a tamper action, generates a tampering signal in order to disable the processing member, thereby avoiding that the data stored in the memory can be retrieved.

A drawback of the known electronic data processing devices is that the disabling operation needs the clock signal of the data processing member and thus to be applied synchronously with the data processing. Consequently, the processor and the bus can still be used for retrieving data before the disabling operation is finished. Since the clock signal of the data processing member is used, the latter still needs to be operational in order to erase the protected data stored in the memory.

It is an object of the present invention to realise an electronic data transfer terminal which is more efficient and provides a better tamper protection.

SUMMARY

For this purpose an electronic data processing device according to the present invention is characterised in that said memory comprises a security register, provided for storing keys for encrypting said secure data and a memory section, provided for temporarily storing secure data processed by said data processing member, said tamper sequencer comprises an internal clock generator, provided for generating upon receipt of said tamper signal a tamper pulse and a series of clock pulses, said tamper sequencer being provided for erasing under control of said tamper pulse, said security data, stored in said security register and for erasing, under control of said series of clock pulses said processed secure data, stored in said memory section. The presence of an internal clock generator enables to no longer use the clock signal of the data processing member and thus to be no longer dependent on the being operational of the data processing member. Moreover, the clock generator can be placed in a safe area within the semiconductor, thereby reducing the probability that the internal clock generator could be damaged by such a tamper action. Since the security register is erased under control of the tamper pulse, the secured data can be quickly erased under control of a single pulse, thereby rendering it rather impossible to access the secure data, once a tamper condition has been detected. The erasure of the secure data processed by the processing member is then performed under control of the series of clock pulses, thereby enabling a synchronously erasure operation. A splitting of the erasure operations is thus possible, thereby enabling a more efficient erasure.

A first preferred embodiment of an electronic data processing device according to the invention is characterised in that said tamper sequencer is provided for generating said tamper pulse asynchronously with respect to said series of clock pulses. This enables to operate independently from the processor and the clock series.

Preferably said tamper pulse has a duration of at most 1 msec. In such a manner the erasure of the security register is quickly realised as the time needed to access this register by an unauthorised person will certainly be longer than 1 msec.

A second preferred embodiment of an electronic data processing device according to the invention is characterised in that said tampering detection and protection circuit is provided for detecting a plurality of tamper conditions and for assigning to each tamper condition an identifying code, identifying the detected tamper condition, said tamper sequencer being provided with tamper recognition means provided for recognising, based on said identifying code, each of said tamper conditions and for attributing a tamper condition priority level to each of said tamper conditions, said tamper condition priority level being selected among a set of priority levels comprising at least a first and a second level value, said tamper sequencer being provided for receiving said tamper condition priority level and for generating said tamper pulse and said series of clock pulses immediately upon receipt of said first level value and for upholding said generation of said tamper pulse and said series of clock pulses for a predetermined time period upon receipt of said second level value. By setting a priority level value, unnecessary erasures can be avoided without affecting the reliability of the device.

A third preferred embodiment of an electronic data processing device according to the invention is characterised in that said tampering detection and protection circuit is provided with a tampering request generator provided for generating a request signal when said predetermined time period has lapsed, said tamper detection and protection circuit being further provided for verifying under control of said request signal if the tamper condition, having caused the tamper signal generation, still remains and for generating an enabling signal if said tamper condition remains and a disabling signal if said tamper condition did not remain, said tampering sequencer being provided for disabling said generation of said upheld tampering pulse and clock pulses under control of said disabling signal and for enabling said generation of said upheld tamper pulse and clock pulses under control of said enabling signal. In such a manner the erasure only takes place if the tamper condition indeed remains after the predetermined period has lapsed.

Preferably said tampering detection and protection circuit is provided for disabling access by said data processing member to said memory as long as said tamper signal remains active. In such a manner the data processing member could not perform some operations as long as the tamper condition remains. This is for example realised by blocking the bus.

Preferably said tampering detection and protection circuit comprises a register provided for storing tamper status data. In such a manner, data providing some information about the tamper action can be stored and later used for analysis purposes.

The invention will now be described in more details with reference to the drawings illustrating a preferred embodiment of an electronic data processing member according to the invention.

DETAILED DESCRIPTION

Figure 1:
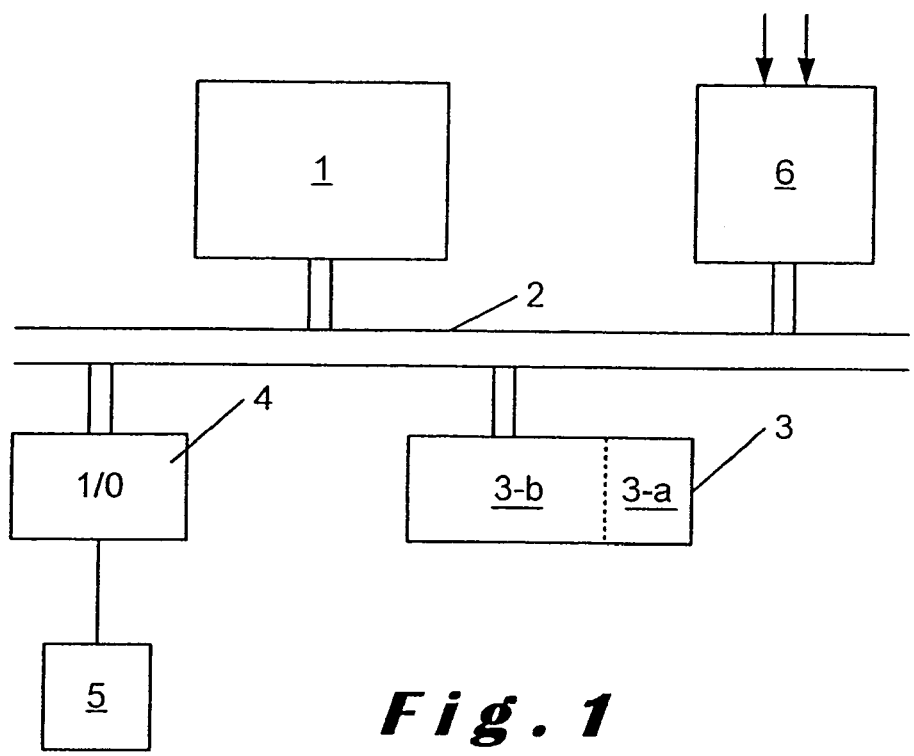
FIG. 1 illustrates schematically an electronic data processing device.

In the drawings, a same reference has been assigned to a same or analogous element.

The electronic data processing device illustrated in FIG. 1 comprises a bus 2 to which a data processing member 1 and a memory 3 are connected, in order to enable a data and instruction transfer between them via the bus. The data processing member is preferably formed by one or more microprocessors. In a most preferred embodiment of a terminal according to the present invention, the data processing member comprises at least two microprocessors. One being provided for processing secure data and another being provided for processing application data. The memory 3 is provided for storing secure data and application data. The secure data comprising the encryption keys are stored in a security register 3-$a$ whereas the processed secure data are temporarily stored in a RAM part 3-$b$.

If the device comprises a dedicated microprocessor for processing the secure data, the RAM part is preferably divided in at least two parts, one of these parts being for storing the processed secure data and which is only accessible by said dedicated microprocessor. In such a manner, there is avoided that a same microprocessor processes the secure data as well as the application data, thus enabling to clearly isolate the secure data and rendering access thereto more difficult.

An input/output interface 4 is further connected to the bus 2. The interface is connected to a user interface 5 for example made by a card reader and a keyboard. Furthermore a tampering detection and protection circuit 6 is connected to the bus.

Preferably the bus 2, the data processing member 1, the memory 3 and the tampering detection and protection circuit are integrated in a same semiconductor element. This allows to render more difficult an access to the individual components, thereby improving the safety of the terminal. Furthermore the manufacturing of the device is made more efficient.

Figure 2:
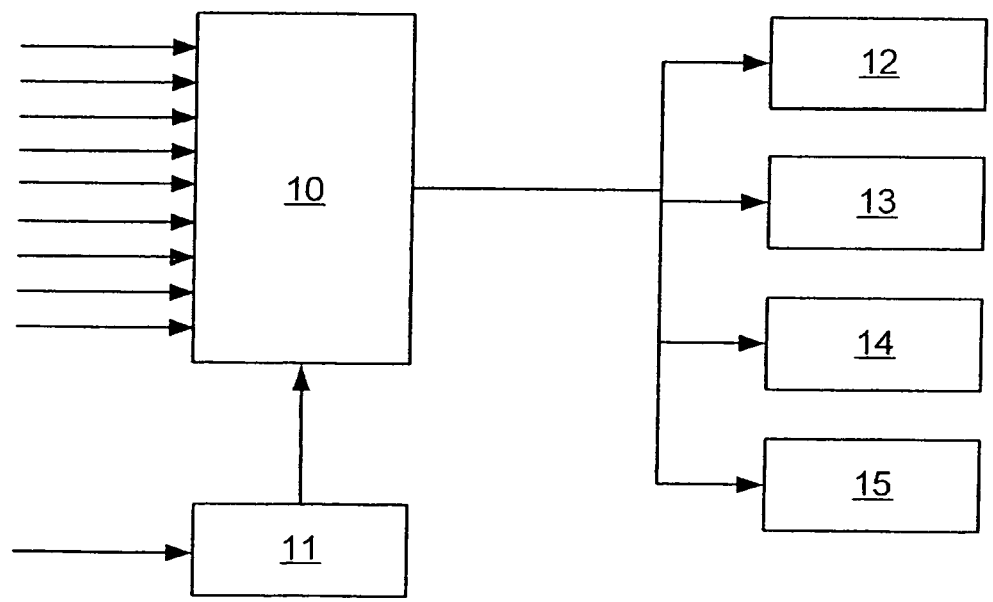
FIG. 2 illustrates in more details the tampering detection and protection circuit.

FIG. 2 illustrates the tampering detection and protection circuit 6 in more details. This circuit comprises a detection unit 10 having a plurality of inputs and comprises a tampering sequencer. A number of this plurality of inputs receive tamper signals generated by detectors placed within the terminals. So, for example, a first detector is formed by blind keys arranged in the keyboard. The blind keys being activated by an unauthorised opening of the keyboard. So, for example the blind keys are continuously in an active or depressed state. If somebody would lift up the keys in order to get access to the memory or the processing member, the blind keys would leave their active state and get into an inactive state, thereby generating a signal indicating a tamper condition. This signal could be formed by a falling or raising edge of a control signal.

A second detector could be formed by pressure sensitive contacts placed within the housing of the terminal. Those contacts are provided for detecting an opening of the housing, for example because their resistive value of a conductive polymer changes in function of the applied pressure. This change of resistive value would then change the value of a current circulating through this detector, thereby generating a tamper condition signal, which is supplied to an input of the detection unit 10.

A third detector could be formed by a JTAG (Joint Test Application Group). Different tests could regularly be done on the terminal in order to verify the normal functioning of the terminal, or even a check on the presence of foreign objects. If those tests provide a negative result, this could lead to a tamper condition supplied to the detection unit 10. Furthermore dedicated chip tests could be carried out on peripheral signals in order to check the operation of the terminal. The same could be done in order to check if the software runs appropriately. Each failure detected in that way would then indicate a tamper condition supplied to an input of the detection unit 10.

The temperature could also be sensed by a fourth detector and furnish a tamper condition if it becomes too low or too high.

A fifth detector could indicate whenever the terminal is switched to a test mode and initiate a tamper condition. This mode is only to be used by the silicon foundry in order to test the terminal after production, in particular the semiconductor element. In normal operation this condition should not appear. As opposed to other tamper conditions, this condition will lead to the fact that after erasure, as set out hereinafter, the secure data will be accessible in order to allow the terminal testing.

A particular condition is provided enabling additional functional testing in the silicon foundry or which can be used to override the internal ROM boot code. If this mode is active, a tamper condition will be generated on assertion of the signal or if the signal is active or reset. When the signal is active, the microprocessor, processing the secure data will boot from an external memory but the internal RAM is not accessible.

The detection unit 10 has a further input connected with an output of a battery monitoring circuit 11. The latter is provided for monitoring if the voltage supplied by the battery is still sufficient to allow a normal operation of the terminal. If this is not the case a tamper condition is established which is supplied to the tampering detection and protection ion unit 10. In particular the battery monitoring circuit monitors if the voltage of the non-volatile memory area becomes too low.

The detection unit 10 is provided for identifying the origin of the tamper condition since the different tamper conditions are supplied to the unit as different inputs. It could also be possible to have one serial input instead of a plurality of inputs and to add to each tamper condition signal, supplied to the detection unit 10, an attribute, identifying the tamper condition. Depending on the tamper condition, the detection unit can either immediately generate a tamper signal or put the condition on hold for a predetermined time period in order to verify if the tamper conditions remain. This time period could be different for each tamper condition. For this purpose the detection unit 10 comprises one or more counters.

If, as illustrated in FIG. 2, the tampering detection and protection ion unit 10 comprises a plurality of inputs, the attributes are assigned in function of the considered input. For this purpose a register is provided inside unit 10 for storing these codes. The receipt at a particular input of a tamper condition signal will cause the retrieval from the register of the attribute assigned to that input. The retrieved attribute will then be added to the tamper condition signal for further processing. If a serial input is used, the code is furnished by the tamper condition itself, supplying an indication about this origin.

Once the tamper signal has been generated, the sequencer is initialised. The sequencer comprises an internal clock generator, provided for generating upon receipt of the tamper signal, a tamper pulse and a series of clock pulses. This internal clock generator operates independently from the clock generator of the data processing member and is housed within the detection unit 10. The tamper pulse causes the encryption keys of the secure data stored in the security register to be erased.

The frequency of the internal clock generator depends on process parameters, voltage and temperature. The frequency is situated in a range of 1 to 10 MHz, preferably 5 MHz.

Whenever a tamper condition occurs, a RAM eraser 12 is activated under control of the series of clock pulses and the memory 3 is disconnected from the bus 2, by disabling the latter and the processing member 1 in such a manner that only the RAM eraser has access to the memory. Any access to the memory by the processor is blocked. The RAM eraser erases the processed secure data stored in the memory for example by overwriting with invalid data, for instance zeros, at least at those locations, where the secure data are stored. Once this erase operation is finished, the RAM eraser releases the bus again and keeps the memory in reset condition. The clock pulses preferably have a 5 MHz frequency in order to quickly erase the memory contents, so that the clearing is realised in less than 1 mseconds. The technology used for implementing the register will also determine the time required for erasing the register content. If the RAM eraser is powered during the tamper condition, the memory is reset after the erase process. If an active tamper condition is present on system reset, the erase process is initiated again. If the memory comprises a dedicated part for storing secure data, this part is cleared as long as the tamper condition is active and until the next reset. The part comprising the application data is only cleared at the instant when the tamper condition occurs for the first time and will no longer be cleared until reset. This feature is advantageous since it allows that it is still possible to download the boot code into the chip using the JTAG interface.

Under control of the series of clock pulses the processing member 1, in particular the one processing the secure data, will be reset and will remain asserted. All encryption keys are cleared in the DES/3 DES (Data Encryption Standard) core, as well as the security registers. This is realised by the reset circuit 15 upon receipt of the second clock pulses.

As already mentioned, attributes could be assigned to the tamper conditions or they could be identified by their respective input of the circuit 10. When such tamper conditions are available, the tampering sequencer is provided with tampering recognition means, provided for recognising the assigned input or attribute. The recognition means attribute to each tamper condition, a tamper condition priority level indicating the priority level value of the concerned tamper condition. The priority level is selected among a set of priority levels comprising at least a first and a second level value. So, for example the first level value could indicate a high priority and the second level a low priority. Of course more than two values could be used for ranking in such a manner the priorities. For example a tamper condition originating from the blind keys could be given a high priority value, whereas a tamper condition originating from a too high temperature could be given a low priority level. The level values are for example stored in a register.

When the tamper sequencer has attributed a priority level value to a tampering signal, this value will determine whether or not the generating of the tamper pulse will be upheld or not. Of course if the priority level value is high, the tamper pulse and the clock pulses will be generated immediately. On the other hand, if the priority level value is low, a time period will be started, for example by setting a counter, during which the generation of the tampering pulse and the series of clock signals will be upheld. When more than two values are used, the time period attributed to each value could be different. The use of those priority values enables to make a distinction between serious tamper conditions, requesting an immediate action, and less serious tamper conditions which could be hazardous and disappear, thereby avoiding unnecessary erasure of the protected secure data.

If a time period has been set, a tampering request generator, which is part of the tampering detection and protection circuit, will generate a request signal when the time period has lapsed. This is for example triggered when the counter has reached its end value. The request signal will cause the tampering detection and protection circuit to verify if the tamper condition having caused the tamper signal generation still remains after the time period has lapsed. This is for example realised by checking the appropriate input of unit 10. If the tamper signal is still present on that input assigned to the tampering detection and protection or having caused the tampering signal to be generated, an enabling signal is generated in order to enable the tampering circuit to generate the tampering pulse and the clock series and stop upholding this generation. If on the other hand the tamper signal is no longer present a disabling signal is generated and the generation of the upheld tamper pulse and clock signal is disabled. This is for example realised by storing the tamper signal in a register and by liberating, respectively clearing the register.

The tampering detection and protection circuit 6 also comprises a register 14 for storing tampering status data. This information is useful for repair purposes, as it allows to monitor why a terminal got in tampering state or what caused the tampering state in the past. If an unauthorised user would try to open the terminal and close it again, the terminal would be tampered and the source could be retrieved from those registers. Furthermore a security register 13 is provided which is preferably battery powered and automatically erased whenever a tamper condition is active. This security register can be used to store a master key for encryption of the internal and external memory.

The invention claimed is:

1. An electronic data processing device, comprising an access protected memory, provided for storing secure data, in particular data related to a fund transfer, and a data processing member connected to said memory via a bus and provided for processing said secure data, said memory comprises a security register provided for storing keys for encrypting said secure data and a memory section provided for temporarily storing secure data processed by said data processing member, said electronic data processing device comprising furthermore a tampering detection and protection circuit connected to said bus and provided for detecting a tamper condition and for generating a tamper signal upon detection of said tamper condition, said tampering detection and protection circuit being connected to a tampering sequencer, provided for disabling said processing member upon receipt of said tampering signal, said tampering sequencer comprises an internal clock generator provided for generating, upon receipt of said tamper signal a tamper pulse and a series of clock pulses, said tampering sequencer being provided for erasing under control of said tamper pulse, said security data stored in said security register and for erasing, under control of said series of clock pulses said processed secure data stored in said memory section.

2. The electronic data processing device as claimed in claim 1, characterised in that said tampering sequencer is provided for generating said tamper pulse asynchronously with respect to said series of clock pulses.

3. The electronic data processing device as claimed in claim 1, characterised in that said tamper pulse has a duration of at most 1 msec.

4. The electronic data processing device as claimed in claim 1, characterised in that said tampering detection and protection circuit is provided for detecting a plurality of tamper conditions and for assigning to each tamper condition an identifying code, identifying the detected tamper condition, said tampering sequencer being provided with tampering recognition means, provided for recognising, based on said identifying code, each of said tamper conditions and for attributing a tampering condition priority level to each of said tamper conditions, said tamper condition priority level being selected among a set o priority levels comprising at least a first and a second level value, said tampering sequencer being provided for receiving said tampering condition priority level and for generating said tamper pulse and said series of clock pulses immediately upon receipt of said first level value and for upholding said generation of said tamper pulse and said series of clock pulses for a predetermined time period, upon receipt of said second level value.

5. The electronic data processing device as claimed in claim 4, characterised in that said tampering detection and protection circuit is provided with a tampering request generator provided for generating a request signal when said predetermined time period has lapsed, said tampering detection and protection circuit being further provided for verifying, under control of said request signal, if the tamper condition, having caused the tamper signal generation, still remains and for generating an enabling signal if said tamper condition remains and a disabling signal if said tampering condition did not remain, said tampering sequencer being provided for disabling said generation of said upheld tampering pulse and clock pulses under control of said disabling signal and for enabling said generation of said upheld tamper pulse and clock pulses under control of said enabling signal.

6. The electronic data processing device as claimed in claim 1, characterised in that said tampering detection and protection circuit is provided for disconnecting, under control of said series of clock pulses, said memory section from said bus before erasing said secure data.

7. The electronic data processing device as claimed in claim 1, characterised in that said series of clock pulses have a frequency situated in a range between 1 and 10 MHz, in particular 5 MHz.

8. The electronic data transfer terminal as claimed in claim 1, characterised in that said tamper processing circuit is provided for disabling any access to said memory as long as said tampering signal remains active.

9. The electronic data processing device as claimed in claim 1, characterised in that said tampering detection and protection circuit comprises a register provided for storing tampering status data.

10. The electronic data processing device as claimed in claim 1, characterised in that said tampering detection and protection circuit is provided for being powered by an autonomous power supply source, independent of the one powering the data processing member.

11. The electronic data processing device as claimed in claim 1, characterised in that said series of clock pulses have a frequency of 5 MHz.

* * * * *